United States Patent
Lv et al.

(10) Patent No.: US 11,941,449 B2
(45) Date of Patent: Mar. 26, 2024

(54) ETHERNET DATA STREAM RECORDING METHOD AND SYSTEM FOR HIGH-SPEED DATA ACQUISITION SYSTEM

(71) Applicants: Institute of Automation, Chinese Academy of Sciences, Beijing (CN); Guangdong Institute of Artificial Intelligence and Advanced Computing, Guangdong (CN)

(72) Inventors: Zhifeng Lv, Beijing (CN); Jie Hao, Beijing (CN); Jun Liang, Beijing (CN); Lin Shu, Beijing (CN); Meiting Zhao, Beijing (CN); Yafang Song, Beijing (CN); Qiuxiang Fan, Beijing (CN)

(73) Assignees: Institute of Automation, Chinese Academy of Sciences, Beijing (CN); Guangdong Institute of Artificial Intelligence and Advanced Computing, Guangdong (CN)

( * ) Notice: Subject to any disclaimer, the term of this patent is extended or adjusted under 35 U.S.C. 154(b) by 122 days.

(21) Appl. No.: 17/597,984

(22) PCT Filed: May 25, 2020

(86) PCT No.: PCT/CN2020/092036
§ 371 (c)(1),
(2) Date: Jan. 31, 2022

(87) PCT Pub. No.: WO2021/203531
PCT Pub. Date: Oct. 14, 2021

(65) Prior Publication Data
US 2023/0086756 A1     Mar. 23, 2023

(30) Foreign Application Priority Data
Apr. 7, 2020 (CN) .......................... 202010266058.6

(51) Int. Cl.
*H04L 12/24* (2006.01)
*G06F 9/50* (2006.01)
*H04L 12/26* (2006.01)

(52) U.S. Cl.
CPC .......... *G06F 9/5027* (2013.01); *G06F 9/5016* (2013.01)

(58) Field of Classification Search
None
See application file for complete search history.

(56) References Cited

U.S. PATENT DOCUMENTS 9,602,437 B1 *   3/2017   Bernath ............. H04L 49/9084
10,446,912 B2 *  10/2019  Choi ...................... H01Q 1/243
(Continued)

FOREIGN PATENT DOCUMENTS

CN    102831015 A    12/2012
CN    105429895 A    3/2016
(Continued)

OTHER PUBLICATIONS

International Search Report from International Application No. PCT/CN2020/092036, dated Jan. 8, 2021, 24 pages.
(Continued)

*Primary Examiner* — Christopher B Robinson
(74) *Attorney, Agent, or Firm* — TraskBritt

(57) ABSTRACT

The field of high-speed data acquisition and network data processing, and particularly relates to an Ethernet data stream recording method, an Ethernet data stream recording system, and an Ethernet data stream recording device for a high-speed data acquisition system. It is intended to solve problems such as a low utilization rate of CPU, poor system compatibility, difficulty in packaging and deployment and low reliability of system transmission of the traditional high-speed data acquisition system. The method of the present disclosure includes: isolating a preset number of CPU cores after a Linux operating system is booted; uninstalling a kernel network card driver of the operating system and creating a hugepage memory pool; for each 10-gigabit network card, allocating a corresponding data-receiving buffer pool and a corresponding lock-free FIFO buffer, and initializing a PCIE register of each 10-gigabit network card such that each 10-gigabit network card enters into an acquisition state; and continuously receiving packets acquired by each 10-gigabit network card in a driving manner of user space polling and performing disk recording. According to the present disclosure, the utilization rate of CPU, system compatibility and transmission reliability are improved and the difficulty in packaging and deployment is decreased.

9 Claims, 4 Drawing Sheets

(56) References Cited

U.S. PATENT DOCUMENTS

| | | | | |
|---|---|---|---|---|
| 2011/0153697 A1* | 6/2011 | Nickolov | ............ | H04L 67/1008 |
| | | | | 707/827 |
| 2011/0173295 A1* | 7/2011 | Bakke | .................. | G06F 9/5027 |
| | | | | 709/217 |
| 2013/0346700 A1* | 12/2013 | Tomlinson | .............. | G06F 9/526 |
| | | | | 711/E12.07 |
| 2015/0207678 A1* | 7/2015 | Li | .......................... | H04L 41/08 |
| | | | | 370/254 |
| 2017/0337069 A1* | 11/2017 | Huang | ................ | G06F 13/4282 |

FOREIGN PATENT DOCUMENTS

| | | | | |
|---|---|---|---|---|
| CN | 105577567 A | * | 5/2016 | ............ H04L 41/12 |
| CN | 106549869 A | | 3/2017 | |
| CN | 107483237 A | | 12/2017 | |
| WO | WO-2014139379 A1 | * | 9/2014 | ............... G06F 9/50 |

OTHER PUBLICATIONS

International Written Opinion from International Application No. PCT/CN2020/092036, dated Jan. 8, 2021, 2 4 pages.

\* cited by examiner

ETHERNET DATA STREAM RECORDING METHOD AND SYSTEM FOR HIGH-SPEED DATA ACQUISITION SYSTEM

CROSS-REFERENCE TO RELATED APPLICATIONS

This application is a national phase entry under 35 U.S.C. § 371 of International Patent Application PCT/CN2020/092036, filed May 25, 2020, designating the United States of America and published as International Patent Publication WO 2021/203531 A1 on Oct. 14, 2021, which claims the benefit under Article 8 of the Patent Cooperation Treaty to Chinese Patent Application Serial No. 202010266058.6, filed Apr. 7, 2020.

TECHNICAL FIELD

The present disclosure relates to the field of high-speed data acquisition and network data processing, and, in particular, to an Ethernet data stream recording method, an Ethernet data stream recording system, and an Ethernet data stream recording device for a high-speed data acquisition system.

BACKGROUND

With development of science and technology, a variety of applications have higher storage bandwidth requirements for data acquisition systems, such as radar signal processing, radio astronomy detection, and high-frame-rate video recording. A high-speed data acquisition system may mainly comprise a high-speed analog-to-digital converter (ADC), a real-time digital signal processor and a storage device, etc. A data transmission bandwidth of the high-speed data acquisition system is generally up to 500 MB/s or more. In the real-time digital signal processor of high-speed data acquisition system, FPGA or DSP chips are generally taken as a control core, and analog-to-digital converted digital signals are stored directly in a local flash array or forwarded to a storage computer via a PCIE bus, high-speed Ethernet and other ways. Compared with transmission schemes based on such as local flash array and PCIE, the high-speed Ethernet transmission scheme has advantages of low cost, high extensibility, long transmission distance and convenient file management.

The high-speed data acquisition system generally uses simple Ethernet protocols, such as User Datagram Protocol (UDP), to transmit data, but has high requirements for data integrity. Since the general-purpose computer operating system is not designed for the high-speed Ethernet to continuously receive packets, the traditional packet capturing process based on traditional PCAP library has a high packet loss rate and a high system load when the bandwidth is greater than 1 Gbps, which cannot meet requirements of high-speed data acquisition for the bandwidth and reliability.

In order to meet transmission and storage requirements of the high-speed data acquisition systems, there are mainly dedicated data acquisition network card, PF_RING framework, data plane development kit (DPDK) and other solutions in the industry. The dedicated data acquisition network card is provided with a hardware acceleration unit specially designed for packet processing, which may significantly lighten CPU load of a storage computer and provide high-bandwidth data recording. PF_RING is a high-speed network packet processing software framework designed by the ntop company, which enables efficient transmission of network packets from a kernel to a user program through a ring queue and memory mapping technology and thus may significantly increase packet capture rate. DPDK is an open source packet processing software proposed by Intel, which can bypass Linux kernel network protocol stacks by directly reading and writing a network card in user space to enable a reliable transmission with more than 10 Gbps. In above three methods, the dedicated acquisition network card is expensive, while the CPU of the host cannot be effectively utilized, causing waste of resources, which is not suitable for cost-sensitive or large-scale deployment scenarios. The PF_RING may support general-purpose network card devices, but it has a compatibility requirement for the version of operating system because a special driver module need to be loaded into the Linux kernel before running, which causes troubles in packaging and deployment of the application program; further, it is necessary to purchase commercial licenses of network interfaces according to the number thereof, which increases cost for applications deployed in large scales. The DPDK focuses on optimizing the transmission efficiency of packets, performance of DPDK is decreased significantly when data processing is added, and the DPDK has complex development environment, and many dependencies for running of programs, and more cumbersome packaging and deployment of application programs. Therefore, the present disclosure provides an Ethernet data stream recording method specialized for a high-speed data acquisition system.

BRIEF SUMMARY

In order to solve the above-mentioned problems in the prior art, i.e., such problems as low utilization rate of CPU, poor system compatibility, difficulty in packaging and deployment during acquisition and recording of data, and low reliability of system transmission in the case of high data bandwidth in the traditional Ethernet-based high-speed data acquisition system, a first aspect of the present disclosure provides an Ethernet data stream recording method for a high-speed data acquisition system, wherein the high-speed data acquisition system is constructed from a Linux operating system, a plurality of 10-gigabit network cards and a high-speed NVMe solid state drive, the method includes:

in step S100, isolating a preset number of CPU cores after a Linux operating system is booted;

in step S200, uninstalling the kernel network card driver of the Linux operating system by the sysfs file system interface and creating a hugepage memory pool; for each 10-gigabit network card, allocating a corresponding data-receiving buffer pool and a corresponding lock-free FIFO buffer by a hugetlbfs file system, and initializing the PCIE BAR registers of each of the plurality of 10-gigabit network cards by the sysfs file system based on a corresponding PCIE address such that each 10-gigabit network card enters into an acquisition state; and in step S300, creating a plurality of worker threads and binding the plurality of worker threads to the CPU core and continuously receiving packets acquired by each 10-gigabit network card in a driving manner of user-space polling and performing disk recording on the packets acquired by each 10-gigabit network card, wherein the worker threads include a data receiving thread and a disk recording thread.

In some implementations, the isolating CPU cores includes reserving at least Core0 for kernel thread scheduling of the Linux operating system.

In some implementations, the uninstalling of the kernel network card driver of the Linux operating system by an sysfs file system and creating a hugepage memory pool in step S200 includes performing the uninstalling by an unbind node in a driver directory of a PCI device in the sysfs file system, setting the number of hugepages in an nr_hugepages node after the uninstalling is completed, and creating the hugepage memory pool.

In some implementations, the allocating a corresponding data-receiving buffer pool and a corresponding lock-free FIFO buffer by the hugetlbfs file system in step 200 includes: allocating, in the hugetlbfs file system, spaces for the data-receiving buffer pool and the lock-free FIFO buffer for each 10-gigabit network card by using mmap.

In some implementations, the initializing a PCIE register of each of the plurality of 10-gigabit network cards by the sysfs file system based on a corresponding PCIE address in the step 200 includes: mapping resource node resource0 of a PCI device of the sysfs file system by using mmap, and reading and writing an offset addresses of a PCIE registers in a corresponding 10-gigabit network card in a mapping space; the reading and writing includes closing an interruption of the 10-gigabit network card, resetting a master chip of the 10-gigabit network card, re-closing the interruption, waiting for a flag indicating a completion of DMA initialization, resetting a header pointer RDH and a tail pointer RDT of a data receiving ring RX, filling a physical address of each DMA description unit, and enabling a jumbo frame and promiscuous mode flag bit.

In some implementations, the continuously receiving packets acquired by each 10-gigabit network card in a driving manner of user-space polling in step 300 includes:

in step S310, transmitting, by each 10-gigabit network card, the acquired packets to system memory through a PCIE bus according to an address corresponding to a DMA description unit in a RX and moving the RDH forward until a STAT_DD flag bit of the DMA description unit at the current location of the RX is 1.

in step S320, obtaining a virtual address of a packet corresponding to the DMA description unit, storing the virtual address in a pointer array; and requesting a new packet receiving space from the hugepage memory pool for initialization and writing a newly buffered physical address to the DMA description unit; and in step S330, cyclically performing step S310 to step S320 until a preset maximum number of packets received at a time is reached, and performing step S340 when the maximum number of packets received at a time is reached; and step S340, moving forward the RDT, freeing a storage space of each 10-gigabit network card, and processing a packet corresponding to the pointer array, copying processing results to the lock-free FIFO buffer, and freeing up a space of the memory pool corresponding to the pointer array after the copying is completed; the processing including integrity detection, and packet header filtering.

In some implementations, the recording method for disk recording includes: retrieving packets from the lock-free FIFO buffer, dividing a single continuous data stream into a plurality of data files and writing the data files to a magnetic or solid-state disk; when a data file has a size lager than a preset threshold, closing the data file and creating a new data file for writing.

A second aspect of the present disclosure provides an Ethernet data stream recording system for a high-speed data acquisition system, including a closure isolator, a network card initializer, and a recorder, wherein the closure isolator is configured to isolate a preset number of CPU cores after a Linux operating system is booted.

the network card initializer is configured to uninstall a kernel network card driver of the Linux operating system by an sysfs file system and create a hugepage memory pool; for each 10-gigabit network card, allocate a corresponding data-receiving buffer pool and a corresponding lock-free FIFO buffer by a hugetlbfs file system, and initialize a PCIE register of each of the plurality of 10-gigabit network cards by the sysfs file system based on a corresponding PCIE address such that each 10-gigabit network card enters into an acquisition state; and the recorder is configured to create a plurality of worker threads and binding the plurality of worker threads to the CPU core and continuously receive packets acquired by each 10-gigabit network card in a driving manner of user-space polling and perform disk recording on the packets acquired by each 10-gigabit network card, wherein the worker threads include a data receiving thread and a disk recording thread.

A third aspect of the present disclosure provides a storage device in which a plurality of programs are stored, the programs are loaded and executed by a processor to implement the above-described Ethernet data stream recording method for a high-speed data acquisition system.

A fourth aspect of the present disclosure provides a processing device including a processor and a storage device; wherein the processor is configured to execute a plurality of programs; the storage device is configured to store the plurality of programs; the programs are loaded and executed by the processor to implement the above-described Ethernet data stream recording method for a high-speed data acquisition system.

The present disclosure has at least the following beneficial effects:

the utilization rate of CPU, compatibility and transmission reliability of the high-speed data acquisition system are improved and the difficulty in packaging and deployment is decreased. In terms of network transmission, on one hand, by reading data in the network card using a driving mode of polling, the uncertainty of the operating system's response to the interruption of the network cards can be avoided and the transmission reliability of the system can be increased. On the other hand, by taking advantage of multi-core CPUs, individual data stream processing threads are separated and bound to an independent CPU core, other tasks in the system are shielded from interrupting and occupying the core, which will reduce unnecessary system calls and thread scheduling, enable efficient parallel processing of data streams, and significantly improve the efficiency of processor usage. In terms of data recording, the multi-queue advantage of NVMe SSDs is used to improve the write performance of multi-way data streams, and the multi-way data streams may be allocated in a balanced manner according to the actual bandwidth requirements and write performance of SSD.

Meanwhile, a standard function library is utilized to implement the data stream recording method, which improves compatibility and portability of the system. Also, the data recording software only needs to be simply copied before running without considering the installation of dependency packages, which greatly simplifies the deployment of the system. Therefore, the present disclosure has the advantages of high transmission reliability, linear scalability, strong system compatibility, and easy deployment.

BRIEF DESCRIPTION OF THE DRAWINGS

Other features, purposes, and advantages of the present disclosure will become more apparent by reading the detailed description of non-limiting embodiments made with reference to the following accompanying drawings.

DETAILED DESCRIPTION

In order to illustrate the objectives, technical solutions and advantages of embodiments of the present disclosure more clearly, the technical solutions in the embodiments of the present disclosure will be described clearly and completely in conjunction with the accompanying drawings. It should be noted that the described embodiments are only part of the embodiments of the present disclosure, rather than all of the embodiments. Based on the embodiments in the present disclosure, all other embodiments obtained by those skilled in the art without making creative effort fall within the scope of protection of the present application.

The present disclosure is described in further detail below in connection with the accompanying drawings and embodiments. It may be understood that the specific embodiments described herein are intended only to explain the relative applications and not to limit them. It is also to be noted that, for ease of illustration, in the accompanying drawings, only those portions that relate to the present disclosure are shown.

It is to be noted that the embodiments and the features in the embodiments of the present disclosure may be combined with each other without conflicts.

Figure 1:
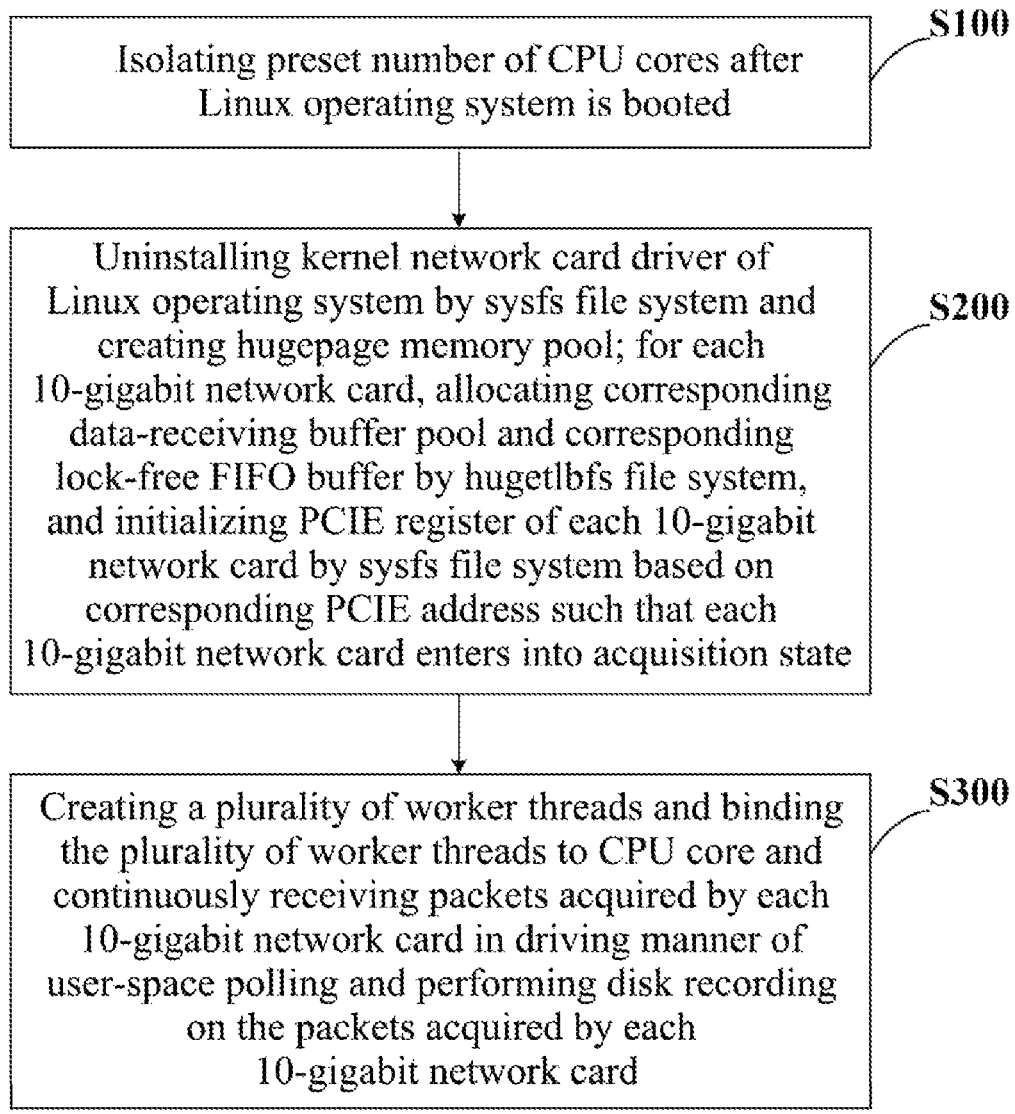
FIG. 1 is a schematic flow chart of an Ethernet data stream recording method for a high-speed data acquisition system according to an embodiment of the present disclosure.

The Ethernet data stream recording method for a high-speed data acquisition system according to the present disclosure, as shown in FIG. 1, includes the following steps:

in step S100, isolating a preset number of CPU cores after a Linux operating system is booted;

in step S200, uninstalling a kernel network card driver of the Linux operating system by an sysfs file system and creating a hugepage memory pool; for each 10-gigabit network card, allocating a corresponding data-receiving buffer pool and a corresponding lock-free FIFO buffer by a hugetlbfs file system, and initializing a PCIE register of each of the plurality of 10-gigabit network cards by the sysfs file system based on a corresponding PCIE address such that to enable entry of each 10-gigabit network card enters into an acquisition state; and in step S300, creating a plurality of worker threads and binding the plurality of worker threads to the CPU core and continuously receiving packets acquired by each 10-gigabit network card in a driving manner of user-mode polling and performing disk recording on the packets acquired by each 10-gigabit network card, wherein the worker threads include a data receiving thread and a disk recording thread.

In order to illustrate the Ethernet data stream recording method for a high-speed data acquisition system according to the present disclosure more clearly, the steps in an embodiment of the method according to the present disclosure are extended and detailed below in conjunction with the accompanying drawings.

In step S100, a preset number of CPU cores are isolated after a Linux operating system is booted.

Figure 3:
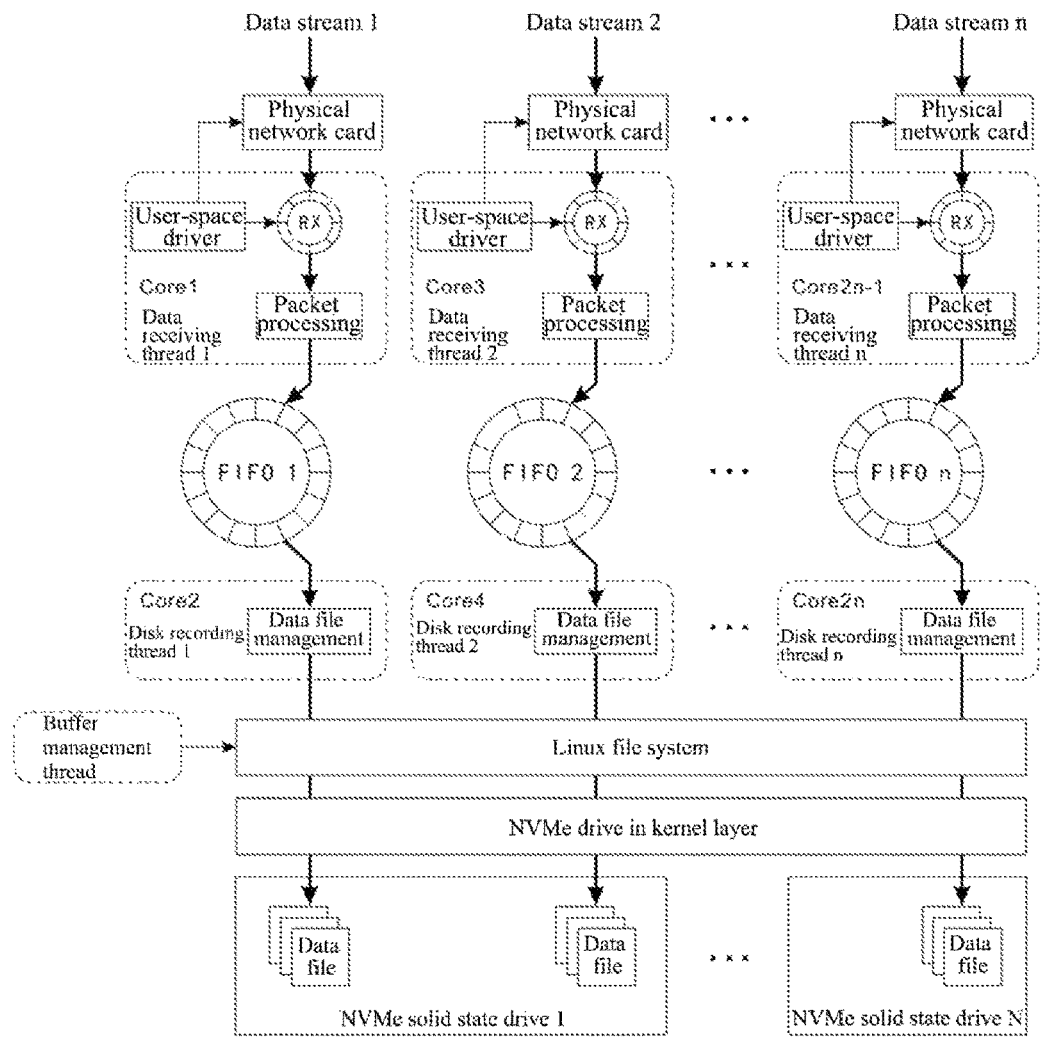
FIG. 3 is a detailed schematic flow chart of an Ethernet data stream recording method for a high-speed data acquisition system according to an embodiment of the present disclosure.

In the present embodiment, the high-speed data acquisition system is first built including the following specific hardware: a plurality of 10-gigabit network cards and high-speed NVMe SSDs, x86 or ARM CPUs with the number of physical cores not less than 2 and capable of supporting at least one PCIE 2.0 x8 and one PCIE 3.0 x4, wherein the 10-gigabit network cards and NVMe SSDs corresponding to each data stream should be installed on a PCIE bus corresponding to a same NUMA node, as shown in FIG. 3. The software is a mainstream Linux operating system with a kernel version of 3.3 or higher. In addition, the number of NVMe SSDs is set to be N in the present disclosure.

After the high-speed data acquisition system is built, a preset number of CPU cores for receiving data and recording file are isolated after the Linux operating system is booted, and the specific processes are as follows.

The CPU cores are isolated by modifying the kernel boot parameter isolcpus, and at least Core0 is reserved for kernel thread scheduling of the operating system, e.g., isolcpus=2-7 means that a total of 6 cores from Core2 to Core7 are isolated exclusively for data stream processing, and the scheduling authorities of the operating systems of cores Core0 and Core1 are reserved. In the present disclosure, the number of isolated cores is preferably set to be 2n. In addition, the Linux operating system is booted (i.e., initialized) for the first time, hyper-threading settings of CPU in the motherboard BIOS need to be closed before the CPU cores are isolated, which is performed only once, and it does not need to be closed again when the operating system is booted later.

In step S200, a kernel network card driver of the Linux operating system is uninstalled by an sysfs file system and a hugepage memory pool is created; for each 10-gigabit network card, a corresponding data-receiving buffer pool and a corresponding lock-free FIFO buffer are allocated by a hugetlbfs file system, and a PCIE register of each of the plurality of 10-gigabit network cards is initialized by the sysfs file system based on a corresponding PCIE address such that each 10-gigabit network card enters into an acquisition state.

Therefore, in present embodiment, the 10-gigabit network cards are initialized in a data recording program. The specific processes are as follows:

in step S210, uninstalling a kernel network card driver of the Linux operating system by an unbind node in the pci device driver directory of the sysfs file system;

in step S220, loading a hugetlbfs file system, creating a hugepage memory pool and allocating a network card data-receiving buffer pool and a large-capacity lock-free FIFO buffer includes: using 2 MB of default page size, setting the number of hugepages through an nr_hugepages node of the sysfs file system, and allocating a network card data receiving buffer pool and a large-capacity lock-free FIFO buffer space in the hugetlbfs by using mmap; the number of lock-free FIFO is set to be n in the present disclosure.

in step S230, obtaining a corresponding PCIE address of each 10-gigabit network card, and initializing a PCIE register of each 10-gigabit network card by the sysfs file system, that is, performing a memory mapping on a network card PCIE BAR0 space and initializing network card registers, which specifically includes: mapping resource node resource0 in a pci device of the sysfs file system by using mmap, and reading and writing contents of offset addresses of the corresponding PCIE registers in a mapping space; the reading and writing includes closing an interruption of the network card, resetting a master chip of the network card, re-closing the interruption, waiting for a flag indicating a completion of DMA initialization, resetting a header pointer RDH and a tail pointer RDT of a data receiving ring RX, filling a physical address of each DMA description unit, and enabling a jumbo frame and promiscuous mode flag bit. Meanwhile, the network card enters into an acquisition state.

step S300, a plurality of worker threads are created and the plurality of worker threads are bound to the CPU core and packets acquired by each 10-gigabit network card in a driving manner of user-space polling are continuously received and disk recording is performed on the packets acquired by each 10-gigabit network card, wherein the worker threads include a data receiving thread and a disk recording thread.

In present embodiment, the worker threads are mainly divided into data receiving threads, magnetic disk recording threads, and buffer management threads. Data stream of each physical network card corresponds to a data receiving thread and a magnetic disk recording thread, respectively, and data are shared between the threads through a lock-free FIFO. In order to reduce the resource overhead due to the thread switching thereby improving parallel processing performance, each data receiving thread and magnetic disk recording thread is bound to an exclusive CPU core. The structural relationship between respective threads is shown in FIG. 3.

Figure 4:
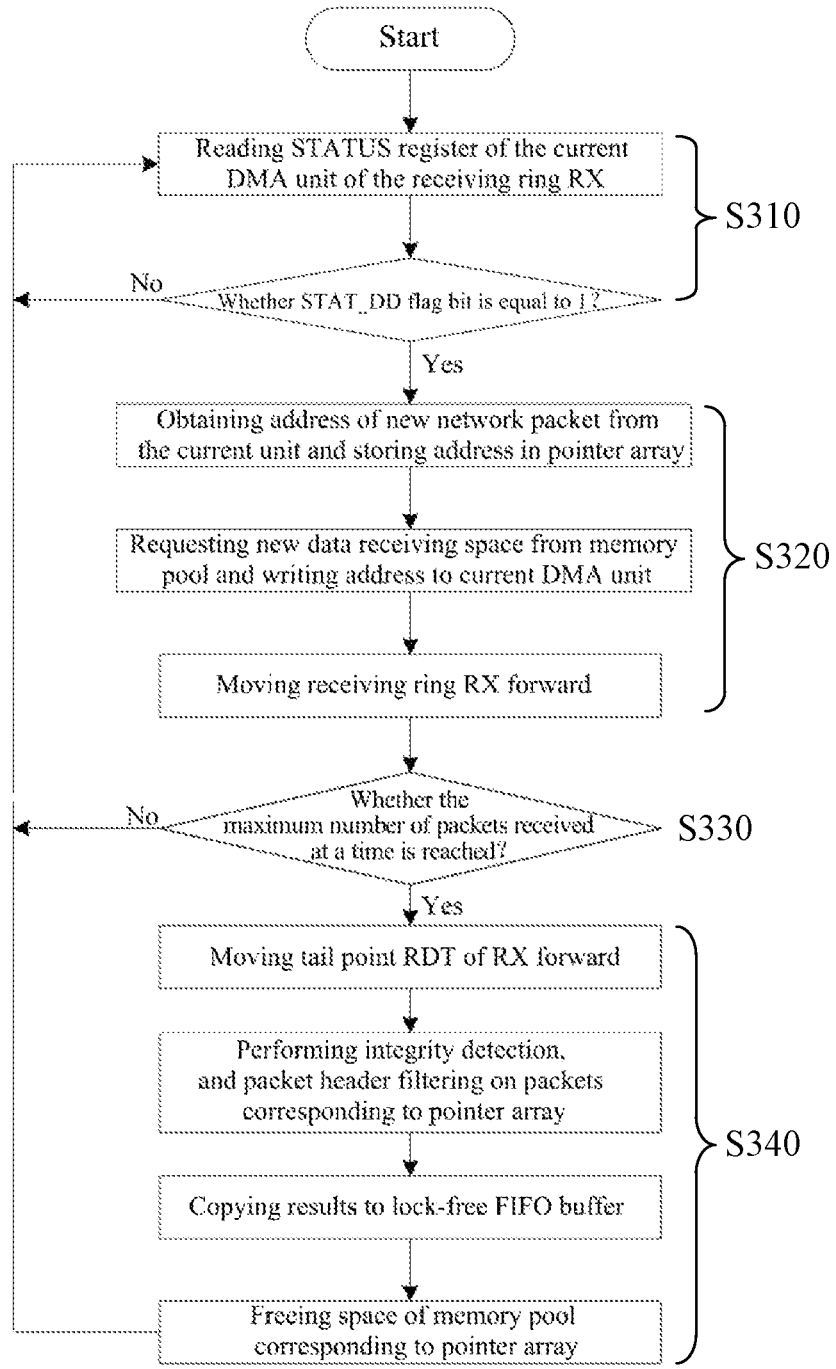
FIG. 4 is a schematic flow diagram showing a process for receiving data by a data receiving thread according to an embodiment of the present disclosure.

The data receiving threads are mainly driven by polling to continuously receive data from network cards. This is because the high-speed data acquisition system has high requirements for both of bandwidth and data integrity, and the general-purpose computer operating system is not designed for the high-speed Ethernet to continuous receive packets and is poor in real-time response to interruption of the network cards. Also, the packets need to be copied for many times from the network card driver, the kernel network protocol stack and then to user spaces, which seriously limits the packet processing efficiency. Especially in an environment of 10-gigabit and above rate, even if a Jumbo Frame of 8 KB or more is used for transmission, the traditional method cannot guarantee a continuous zero packet loss. Therefore, in the present embodiment, the data from network cards are read in a driving manner of a user-space polling to avoid the uncertainty of the operating system's response to interruption of the network cards. Then an integrity detection, packet header filtering, etc. are performed on the packets, and finally valid data is transferred to the lock-free FIFO. The specific steps for receiving packets from the network card in a polling manner includes the following steps, as shown in FIG. 4:

step S310, based on the acquired packets or data streams (of which the number is n), transmitting, by each 10-gigabit network card, the packets to system memory through a PCIE bus according to an address corresponding to a DMA description unit in a data receiving ring RX, then setting relevant data bits of a STATUS register by a hardware and simultaneously moving the header pointer RDH of the RX forward; by a data receiving thread, cyclically reading the DMA description at the current location of the data receiving ring RX until the STAT_DD flag bit of the STATUS register is 1;

step S320, obtaining a virtual address of a network packet corresponding to the DMA description unit, storing the virtual address in a pointer array; and requesting a new packet receiving space from the hugepage memory pool for initialization and writing a newly buffered physical address to the current DMA description unit; and step S330, cyclically performing step S310 and step S320 until a preset maximum number of packets received at a time is reached, and performing step S340 when the maximum number of packets received at a time is reached; wherein in order to reduce the number of memory operations, the strategy of single processing after packets are received in bulk is used, and the maximum number of packets received at a time is an artificially preset value, which is generally smaller than the size of a network card buffer; and step S340, moving forward a tail pointer RDT of the RX, freeing a storage space of 10-gigabit network card hardware, and performing such as integrity detection, and packet header filtering on packets corresponding to a pointer array, copying processing results to the lock-free FIFO buffer, and freeing a space of the memory pool corresponding to the pointer array after the copying is completed.

The disk recording thread is responsible for retrieving data from the lock-free FIFO buffer, dividing a single continuous data stream into a plurality of data files and writing the data files to a magnetic or solid-state disk; when the size of the data file is larger than a preset threshold, closing the current data file and creating a new data file for writing.

The buffer management thread is responsible for regularly freeing the buffer of the operating system in which files have been written to improve sequential write performance.

In addition, the recording method according to the present disclosure supports two modes including a continuous recording mode and a cyclic recording mode, where the continuous recording mode is to continuously create new data files until the magnetic disk is full; the cyclic recording mode is to only save the data content of a preset size in the most recent time, and automatically overwrite the earliest data file when the continuously recorded data exceeds the preset size.

Figure 2:
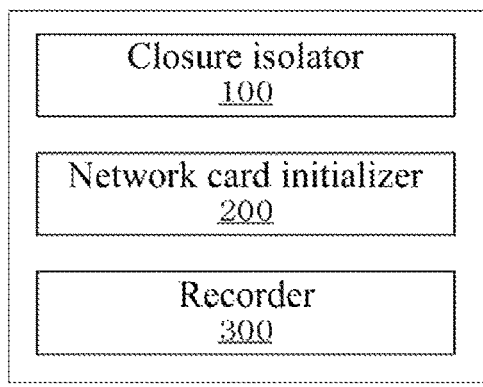
FIG. 2 is a schematic diagram of a framework of an Ethernet data stream recording system for a high-speed data acquisition system according to an embodiment of the present disclosure.

As shown in FIG. 2, an Ethernet data stream recording system for a high-speed data acquisition system according to a second embodiment of the present disclosure includes: a closure isolator 100, a network card initializer 200, and a recorder 300.

The closure isolator 100 is configured to isolate a preset number of CPU cores after a Linux operating system is booted.

The network card initializer 200 is configured to uninstall a kernel network card driver of the Linux operating system by an sysfs file system and create a hugepage memory pool; for each 10-gigabit network card, allocate a corresponding data-receiving buffer pool and a corresponding lock-free FIFO buffer by a hugetlbfs file system, and initialize a PCIE register of each 10-gigabit network card by the sysfs file system based on a PCIE address corresponding to each 10-gigabit network card such that each 10-gigabit network card enters an acquisition state.

The recorder 300 is configured to create a plurality of worker threads and binding the plurality of worker threads to the CPU core and continuously receive packets acquired by each 10-gigabit network card in a driving manner of user-space polling and perform disk recording on the packets acquired by each 10-gigabit network card, wherein the worker threads include a data receiving thread and a disk recording thread.

It will be clear to those skilled in the art that, for the convenience and brevity of the description, the specific working processes and related descriptions of the system described above may be referred to the corresponding processes in the preceding method embodiments and will not be repeated herein.

It should be noted that the Ethernet data stream recording system for a high-speed data acquisition system according to the above embodiment is illustrated by dividing each functional module described above only, and in actual application, the above functions may be implemented by different functional modules as needed, i.e., the modules or steps in the embodiment of the present disclosure may be re-divided or re-combined, for example, the modules according to the above embodiment may be combined into one module, or may be further split into multiple sub-modules to implement all or part of the above described functions. The names of the modules and steps involved in the embodiments of the present disclosure are only for the purpose of distinguishing the individual modules or steps, and are not considered to be limited to the present disclosure.

A storage device according to a third aspect of the present disclosure has a plurality of programs stored therein, the programs are loaded by a processor to implement the above-described Ethernet data stream recording method for a high-speed data acquisition system.

A processing device according to a fourth aspect of the present disclosure includes a processor and a storage device; wherein the processor is configured to execute a plurality of program; the storage device is configured to store the plurality of programs; the programs are loaded and executed by the processor to implement the above-described Ethernet data stream recording method for a high-speed data acquisition system.

It will be clear to those skilled in the art that, for the convenience and brevity of the description, the specific working processes and related descriptions of the storage device and the processing device described above may be referred to the corresponding processes in the preceding method embodiments and will not be repeated herein.

Figure 5:
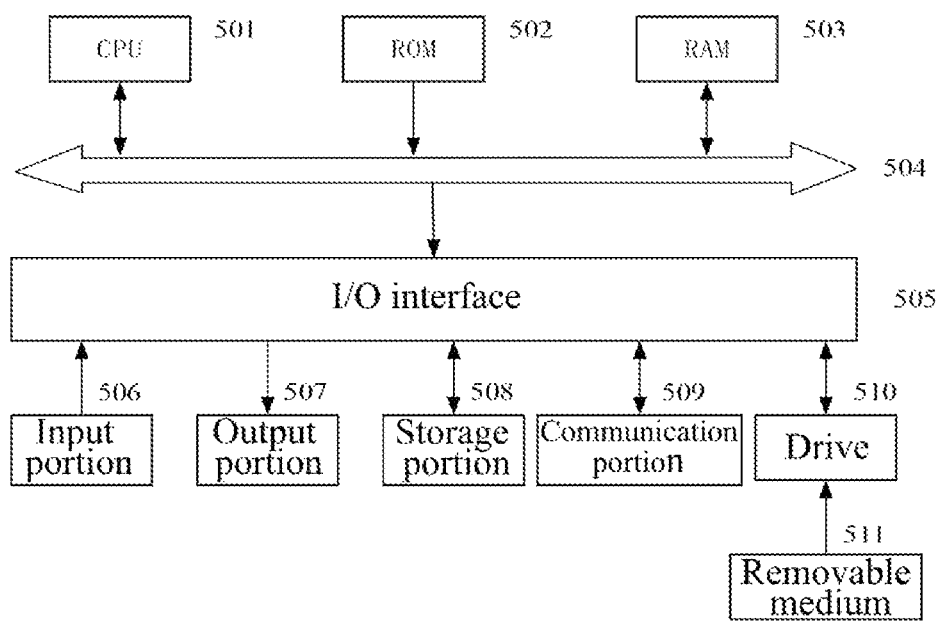
FIG. 5 is a schematic structural diagram showing a computer system of an electronic device suitable for implementing embodiments of the present disclosure.

FIG. 5 illustrates a schematic structural diagram showing a computer system of a server suitable for implementing the method, system, and apparatus embodiments according to the present disclosure. The server illustrated in FIG. 5 is merely an example and should not be limited to the functionality or scope of use of embodiments of the present disclosure.

As shown in FIG. 5, the computer system includes a central processing unit (CPU) 501 that may perform various operations and processing based on programs stored in a read-only memory (ROM) 502 or programs loaded from a storage portion 508 into a random access memory (RAM) 503. In RAM 503, various programs and data required for operation of the system are also stored. The CPU 501, ROM 502, and RAM 503 are connected to each other through bus 504. The input/output (I/O) interface 505 is also connected to the bus 504.

The following components are connected to the I/O interface 505: an input portion 506 including a keyboard, mouse, etc.; an output portion 507 including, for example, a cathode ray tube (CRT), a liquid crystal display (LCD), etc., and a speaker, etc.; the storage portion 508 including a hard disk, etc. and a communication portion 509 including a network interface card such as a local area network (LAN) card, a modem, etc. The communication portion 509 performs communication processing through a network such as the Internet. A driver 510 is also connected to an I/O interface 505 as needed. Removable medium 511, such as magnetic disks, CD-ROMs, magnetooptical disks, semiconductor memory, etc., are provided on the driver 510 as needed so that computer programs read therefrom may be installed into the storage portion 508 as needed.

In particular, according to embodiments of the present disclosure, the process described above with reference to the flowchart may be implemented as a computer software program. For example, embodiments according to the present disclosure include a computer program product including a computer program loaded on a computer readable medium, the computer program includes program code for performing the method shown in the flowchart. In such an embodiment, the computer program may be downloaded and installed from a network through communication portion 509, and/or installed from a removable medium 511. When the computer program is executed by the central processing unit (CPU) 501, the above-described functions as defined in the method of the present disclosure are performed. It should be noted that the computer readable medium described above in the present disclosure may be a computer readable signal medium or a computer readable storage medium or any combination of both of the above. For example, the computer readable storage medium may be but not limited to an electrical, magnetic, optical, electromagnetic, infrared, or semiconductor system, device, or apparatus, or any combination of the above. More specific examples of computer-readable storage media may include, but are not limited to: electrically connected portable computer disks with one or more wires, hard disks, random access memory (RAM), read-only memory (ROM), erasable programmable read-only memory (EPROM or flash memory), optical fiber, portable compact disk read-only memory (CD-ROM), optical storage devices magnetic memory device, or any suitable combination thereof. In the present disclosure, a computer readable storage medium may be any tangible medium that contains or stores a program that may be used by or in combination with an instruction execution system, device, or apparatus. In the present disclosure, the computer-readable signaling medium may include data signals propagated in the baseband or as part of a carrier wave that carry computer readable program codes. Such propagated data signals may take a variety of forms, including but not limited to electromagnetic signals, optical signals, or any suitable combination thereof. The computer readable signal medium may also be any computer readable medium other than a computer readable storage medium that sends, propagates, or transmits programs for use by or in conjunction with an instruction execution system, device, or apparatus. Program codes contained in the computer readable medium may be transmitted using any suitable medium, including, but not limited to: wireless, wire, fiber optic cable, RF, and the like, or any suitable combination thereof.

The computer program codes for performing the operations of the present disclosure may be written in one or more of programming languages or combinations thereof, the programming languages includes object-oriented programming languages such as Java, Smalltalk, C++, and also includes conventional procedural programming languages such as "C" language or similar programming languages.

The program codes may be executed entirely on the user's computer, partially on the user's computer, as a stand-alone package, partially on the user's computer and partially on a remote computer, or entirely on a remote computer or server. In the case that a remote computer is involved, the remote computer may be communicated to the user computer through any kind of network including a local area network (LAN) or a wide area network (WAN) or may be connected to an external computer (e.g., using an Internet service provider to connect through the Internet).

The flowcharts and block diagrams in the accompanying drawings illustrate possibly implemented architecture, functionality, and operation of systems, methods, and computer program products in accordance with various embodiments of the present disclosure. Each block in a flow chart or a block diagram may represent a module, a program segment, or a part of codes containing one or more executable instructions for implementing a prescribed logical function. It should also be noted that in some alternative implementations, the functions indicated in the blocks may also occur in a different order than that indicated in the accompanying drawings. For example, two adjacent blocks may actually be executed in substantially parallel, and may sometimes be executed in a reverse order, depending on the function involved. It is also noted that each box in the block diagram and/or flowchart, and the combination of blocks in the block diagram and/or flowchart may be implemented with a dedicated hardware-based system that performs the specified function or operation, or may be implemented with a combination of dedicated hardware and computer instructions.

Terms "first," "second," etc. are used to distinguish similar objects and are not used to describe or indicate a particular order or sequence.

A term "include" or any other variants thereof is intended to cover non-exclusive inclusion, so that a process, a method, an article, or a device that includes a series of elements includes not only those elements, but also includes other elements, which are not explicitly listed or also include elements inherent to the process, the method, the article or the device.

Therefore, the technical solutions of the present disclosure have been described in conjunction with the preferred embodiments shown in the accompanying drawings, but it is readily understood by those skilled in the art that the scope of protection of the present disclosure is clearly not limited to these specific embodiments. Without departing from the principles of the present disclosure, those skilled in the art may make equivalent changes or substitutions to the relevant technical features, and these changed or substituted technical solutions will fall within the scope of protection of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for recording Ethernet data stream, implemented at a high-speed data acquisition system, the high-speed data acquisition system being constructed from a Linux operating system, a plurality of 10-gigabit network cards and a high-speed NVMe solid state drive, comprising:
   step S100, isolating a preset number of CPU cores after the Linux operating system is booted;
   step S200, uninstalling a kernel network card driver of the Linux operating system by an sysfs file system and creating a hugepage memory pool; for each 10-gigabit network card, allocating a corresponding data-receiving buffer pool and a corresponding lock-free FIFO buffer by a hugetlbfs file system, and initializing a PCIE register of each of the plurality of 10-gigabit network cards by the sysfs file system based on a corresponding PCIE address such that each 10-gigabit network card enters into an acquisition state;
   wherein the uninstalling of the kernel network card driver of the Linux operating system by an sysfs file system and creating a hugepage memory pool in step S200 comprises performing the uninstalling by an unbind node in a driver directory of a pci device in the sysfs file system, setting the number of hugepages in an nr_hugepages node after the uninstalling is completed, and creating the hugepage memory pool;
   step S300, creating a plurality of worker threads and binding the plurality of worker threads to the CPU core, and continuously receiving packets acquired by each 10-gigabit network card in a driving manner of user-space polling and performing disk recording on the packets acquired by each 10-gigabit network card, wherein the worker threads include a data receiving thread and a disk recording thread.

2. The method of claim 1, wherein the isolating CPU cores further comprises reserving at least Core0 for kernel thread scheduling of the Linux operating system.

3. The method of claim 1, wherein the allocating a corresponding data-receiving buffer pool and a corresponding lock-free FIFO buffer by the hugetlbfs file system in step 200 comprises: allocating, in the hugetlbfs file system, spaces for the data-receiving buffer pool and the lock-free FIFO buffer for each 10-gigabit network card by using mmap.

4. The method of claim 1, wherein the initializing a PCIE register of each of the plurality of 10-gigabit network cards by the sysfs file system based on a corresponding PCIE address in the step 200 comprises: mapping resource node resource0 of a pci device of the sysfs file system by using mmap, and reading and writing an offset address of a PCIE register in a corresponding 10-gigabit network card in a mapping space; the reading and writing comprises closing an interruption of the 10-gigabit network card, resetting a master chip of the 10-gigabit network card, re-closing the interruption, waiting for a flag indicating a completion of DMA initialization, resetting a header pointer RDH and a tail pointer RDT of a data receiving ring RX, filling a physical address of each DMA description unit; and enabling a jumbo frame and promiscuous mode flag bit.

5. The method of claim 4, wherein the continuously receiving packets acquired by each 10-gigabit network card in a driving manner of user-space polling in step 300 comprises:

step S310, transmitting, by each 10-gigabit network card, the acquired packets to system memory through a PCIE bus according to an address corresponding to a DMA description unit in a RX and moving the RDH forward until a STAT_DD flag bit of the DMA description unit at the current location of the RX is 1;

step S320, obtaining a virtual address of a packet corresponding to the DMA description unit, storing the virtual address in a pointer array; and requesting a new packet receiving space from the hugepage memory pool for initialization and writing a newly buffered physical address to the DMA description unit; and step S330, cyclically performing step S310 and step S320 until a preset maximum number of packets received at a time is reached, and performing step S340 when the maximum number of packets received at a time is reached; and step S340, moving forward the RDT, freeing a storage space of each 10-gigabit network card, and processing a packet corresponding to the pointer array, copying processing results to the lock-free FIFO buffer, and freeing a space of the memory pool corresponding to the pointer array after the copying is completed;

wherein the processing includes integrity detection, and packet header filtering.

6. The method of claim 5, wherein the disk recording comprises:

retrieving packets from the lock-free FIFO buffer, dividing a single continuous data stream into a plurality of data files and writing the data files into a magnetic disk; when a data file has a size lager than a preset threshold, closing the data file and creating a new data file for writing.

7. A system for recording Ethernet data stream, used in a high-speed data acquisition system, comprising a closure isolator, a network card initializer, and a recorder, wherein the closure isolator is configured to isolate a preset number of CPU cores after a Linux operating system is booted;

the network card initializer is configured to uninstall a kernel network card driver of the Linux operating system by an sysfs file system and create a hugepage memory pool; for each 10-gigabit network card, allocate a corresponding data-receiving buffer pool and a corresponding lock-free FIFO buffer by a hugetlbfs file system, and initialize a PCIE register of each of the plurality of 10-gigabit network cards by the sysfs file system based on a corresponding PCIE address such that each 10-gigabit network card enters into an acquisition state, wherein the network card initializer is configured to uninstall the kernel network card driver of the Linux operating system by an sysfs file system and create the hugepage memory pool by performing uninstalling by an unbind node in a driver directory of a pci device in the sysfs file system, setting the number of hugepages in an nr_hugepages node after the uninstalling is completed, and creating the hugepage memory pool; and the recorder is configured to create a plurality of worker threads and binding the plurality of worker threads to the CPU core and continuously receive packets acquired by each 10-gigabit network card in a driving manner of user-space polling and perform disk recording on the packets acquired by each 10-gigabit network card, wherein the worker threads include a data receiving thread and a disk recording thread.

8. A storage device, having a plurality of programs stored, wherein the programs are loaded and executed by a processor to implement the method according to claim 1.

9. A processing device comprising a processor and a storage device; wherein the processor is configured to execute a plurality of programs; the storage device is configured to store the plurality of programs; and the programs are loaded and executed by the processor to implement the method according to claim 1.

* * * * *